United States Patent [19]

Li

[11] Patent Number: 5,286,293
[45] Date of Patent: Feb. 15, 1994

[54] MULTIFUNCTIONAL POWDER MATERIAL FOR PROTECTING BUILDINGS AND PROCESS FOR THE SAME

[75] Inventor: Jianhua Li, Yuantong Town, China

[73] Assignee: Jianxin Waterproof Powder Factory of Chonging County, Sichuan Province, China

[21] Appl. No.: 853,206

[22] Filed: Mar. 18, 1992

[30] Foreign Application Priority Data

Jul. 9, 1991 [CN] China .............................. 91104534.1

[51] Int. Cl.$^5$ .............................................. C09C 1/02
[52] U.S. Cl. ................................................... 106/817
[58] Field of Search ................................ 106/817, 464

[56] References Cited

U.S. PATENT DOCUMENTS 4,767,464 8/1988 Strauch et al. ..................... 106/464

Primary Examiner—Mark L. Bell
Assistant Examiner—A. Wright
Attorney, Agent, or Firm—Roylance, Abrams, Berdo & Goodman

[57] ABSTRACT

The present invention discloses a multifunctional powder material for protecting buildings and process for the same. Said multifunctional powder material contains fine powders of refined limestone, dolomite and marble, a straight-chain alkyl acid or a straight-chain alkane containing 16–25 carbon atoms hydrophobic agent packed closely on the whole surfaces of said powders, the usage of said hydrophobic agent is at least 0.3 percent by weight (based on the total weight of the mixture of said powders).

10 Claims, 1 Drawing Sheet

MULTIFUNCTIONAL POWDER MATERIAL FOR PROTECTING BUILDINGS AND PROCESS FOR THE SAME

FIELD OF THE INVENTION

The present invention relates to a powder material for protecting buildings and process for the same. Particularly, the present invention relates to a powder material possessing multifunctional characteristics for protecting buildings, such as heat isolation and heat preservation, water-proofing, insulation, flame retardation etc., and process for the same.

BACKGROUND OF THE INVENTION

Heat isolation and preservation, water-proofing, insulation and flame retardation etc. for buildings are very important in architectural engineering. In order to solve these problems, many kinds of materials for protecting buildings have been developed already. Water-proofing materials include water-proofing rolls and slices, coatings or paints, such as polychloroprene asphalt emulsion, polyurethane water-proofing coating, etc.; sealing ointments, such as tar polymethane water-proofing glue, etc. Heat isolating and preserving materials, insulating materials as well as flame retardation materials have also been developed. But among these materials, most of them possess only one function. For example, water-proofing materials only have the action of water-proofing. Insulating materials only have the action of insulating, etc. Moreover, organic substances are used in these materials, they are combustible and have no flame retardability. In addition, the protecting materials known in the prior art can be brought in play only with the aid of some other auxiliary materials, and their costs are rather high, and the processes for the utilization of them are rather complicate. Furthermore, these protecting materials will be deformed in case of the ageing of said auxiliary materials and/or the crevice or the deformation of the building's foundation, and the protectabilities of these protecting materials will be lost.

OBJECTS OF THE INVENTION

One object of the present invention is to provide a powder material for protecting buildings overcoming the shortcomings of the prior arts, said powder material possesses multifunctional characteristicses for protecting buildings, such as heat isolation, heat preservation, water-proofing, insulation as well as flame retardation.

Another object of the present invention is to provide a process for preparing said powder material for protecting buildings.

SUMMARY OF THE INVENTION

The present invention relates to a multifunctional powder material for protecting buildings and process for the same, said powder material contains fine powders of refined limestone, dolomite and marble, which have diameters of larger or equal to 325 mesh, a straight-chain alkyl acid or straight-chain alkane containing 16-25 carbon atoms hydrophobic agent packed closely on the whole surfaces of said fine powders, the usage of said hydrophobic agent is at least 0.3 percent by weight (based on the total weight of the mixture of said powders).

The process for preparing said powder material of the present invention comprises: roasting and decomposing limestone, dolomite and marble at a temperature in the range of 900–1000, 1700–1800, and 730–760 respectively, then slaking the decomposed products of said natural limestone, dolomite and marble with water separately, coarse sieving to remove particles having large diameters (the undecomposed parts), crushing the screen underflow and removing the heavy components in said screen underflow, carbonizing said particles having no heavy components in a carbonizing furnace, drying and fine screening to obtain fine powders of refined limestone, dolomite and marble separately; then drying the fine powders of refined limestone, dolomite and marble obtained thereof in a drying stove at a temperature in the range of 160°–300° C. separately to obtain powder of limestone, dolomite and marble with moisture content less than 1.5 percent by weight; mixing said three fine powders in a stirrer at a temperature in the range of 120°–200° C. according to the composition of the multifunctional powder of the present invention; treating said mixture with at least 0.3 percent by weight (based on the total weight of the mixture) of a straight-chain alkyl acid or a straight-chain alkane containing 16-25 carbon atoms for 16-60 minutes, cooling said treated mixture to obtain the multifunctional powder material for protecting buildings of the present invention.

BRIEF DESCRIPTION OF THE DRAWING

The attached drawing is the schematic diagram of the microstructure of the multifunctional powder material for protecting buildings of the present invention.

DETAILED DESCRIPTION OF THE INVENTION

Figure 1:
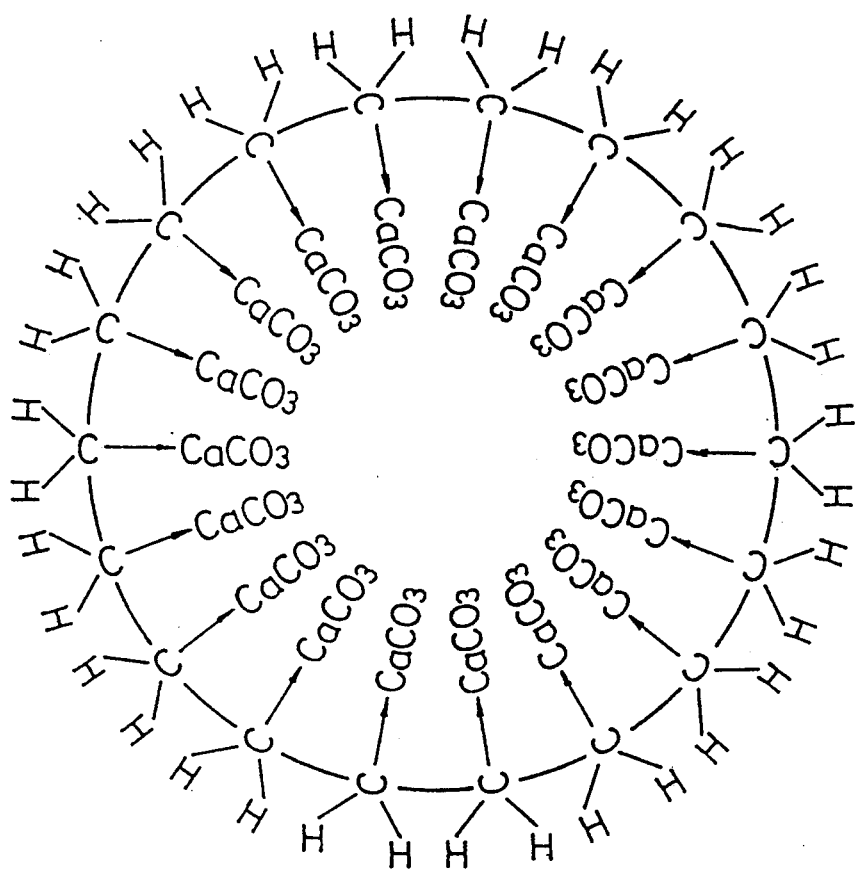

The present invention relates to a multifunctional powder material for protecting buildings and process for the same. Said powder material contains fine powders of refined limestone, dolomite and marble, which have diameters of larger or equal to 325 mesh, a straight-chain alkyl acid or straight-chain alkane containing 16-25 carbon atoms hydrophobic agent packed closely on the whole surfaces of said fine powders, the usage of said hydrophobic agent being at least 0.3 percent by weight (based on the total weight of the mixture of said powders).

The multifunctional powder material for protecting buildings of the present invention makes use of natural limestone, dolomite and marble as raw materials. Natural limestone, dolomite and marble are roasted at a temperature in the range of 900°–1000° C., 1700°–1800° C., and 730°–760° C. respectively to obtain decomposed products thereof; said decomposed products are slaked with water and then coarse screened to remove the undecomposed components; the screen underflows are crushed and the heavy components therein are removed; the materials obtained thereby are dried and dehydrated and finally screened with a screen of 325 mesh separately to obtain fine powders of refined limestone, dolomite and marble having a size larger or equal to 325 mesh respectively. Among them, the fine powder of refined limestone is fine powder of super-light calcium carbonate.

The main components in the multifunctional powder for protecting buildings of the present invention are the fine powders of refined natural inorganic ores, including fine powders of refined limestone, dolomite and marble. The coefficients of heat conductivity of said powders are very small, and the heat value of these powders are very low. Furthermore, these powders are insulative and non-combustible. The whole surfaces of these powders are covered with a straight-chain alkyl acid or a straight-chain alkane hydrophobic agent. Therefore, the multifunctional powder material for protecting buildings of the present invention has excellent properties of heat isolation, heat preservation, insulation, flame retardation as well as water-proofing.

In the multifunctional powder for protecting buildings of the present invention, the weight proportion of fine powders of refined limestone, dolomite and marble is in the range of 60–90:5–25:5–25, preferably in the range of 75–80:10–15:10–15, and most preferably is 80:10:10.

Any one of the straight-chain alkyl acids or the straight-chain alkanes having 16–25 carbon atoms can be used as the hydrophobic agent. Octadecylic acid is preferred. The amount of said hydrophobic agent used for treating the powder mixture of limestone, dolomite marble is at least 0.3 percent by weight, preferably in the range of 0.3–0.5 percent by weight, most preferably is 0.5 percent by weight (based on the total weight of the powder mixture).

In the multifunctional powder material for protecting buildings of the present invention, the heavy components in the fine powders of refined limestone, dolomite and marble have been removed. For example, the fine powder of refined limestone is the fine powder of super-light calcium carbonate, and the fine powders of dolomite and marble also have no heavy components. Therefore, the multifunctional powder for protecting buildings of the present invention made from said fine powders has superior flowability. The multifunctional powder of the present invention can be paved on the roof of a building as a protective layer. When the foundation of the building paved with the powder of the present invention on the roof has crevice or deformation, the powder will fill up the crevice on the roof caused by the crevice or deformation of the foundation of the building. The protecting effects of the powder of the present invention can be maintained well enough.

The main physical characteristics of the multifunctional powder of the present invention are as follows:

Bulk specific gravity: $<550$ Kg/m$^3$
Coefficient of thermal conductivity: $<0.090$ W/m. K
Heat value: $<150$ KJ/Kg
Moisture content: $<1.5$ percent by weight The multifunctional powder for protecting buildings of the present invention can be used alone on the roofings of new or old buildings, cold storage, warehouse, basement, tunnels and conduits, for the sake of waterproofing, heat isolation and preservation, flame retardation and insulation; and can also be sprayed on the 90°–180° vertical spaces after diluting, house corners etc.; and can also be used after mixed with cement. It is especially advantageous that the multifunctional powder of the present invention can be used on the wet surfaces without any disadvantage influences.

When the multifunctional powder for protecting buildings of the present invention is used as the protecting material for the top story of a building, it is only required to spread a layer of 5–10 mm of said powder on the base surface of the roof, then cover with an isolating paper, and lastly, spread a layer of No. 200 concrete of 3–5 mm thick as protecting layer. The protecting structure obtained on said roof thereby can make the top story rooms have temperature differences of nearly 5° C. between inside and outside. That is to say, during summer, the temperature inside the top story rooms can be about 5° C. lower than the temperature outside, and during winter, the temperature inside the top story rooms can be about 5° C. higher than the temperature outside. Therefore, the energy for adjusting the indoor temperature can be decreased.

When the multifunctional powder of the present invention is used as the protecting material of a vertical surface, the powder of the present invention, No. 425 cement, and sand of moderate size are mixed uniformly at a weight proportion of 1:2:0.5, water is added to the mixture and stirred uniformly, and then is smeared on the vertical surfaces uniformly. A layer of 1–2 cm thick of said mixture will have satisfactory effect of protection, such as water and moisture proofing, flame retardation, heat isolation and preservation, etc.

The characteristic parameters of the multifunctional powder for protecting buildings of the present invention are determined according to the following methods:

1. Bulk specific gravity: ASTM C97-83(1988)
2. Coefficient of thermal conductivity: ASTM C177-85
3. Heat value: ISO 1716
4. Water Permeability Test A glass tube having an inner diameter of 20 mm and a length of 1000 mm is used. Said glass tube has two openings at its two ends. A rubber plug having at least four holes of diameter of larger than 4 mm is plugged at one end of said glass tube. A piece of filter paper having a diameter a little less than the inner diameter of said tube is put over the rubber plug. Then the testing powder sample is added into said glass tube and compressed slightly with a glass rod having a rubber plug or cork. The height of the testing sample is 5–8 mm high after compressing. Then a filter paper having diameter slightly less than the inner diameter of said glass tube is placed on the surface of the sample. Then the glass tube filled with powder sample is erected and water is added into said glass tube until the water column reaches 600 mm high ($5.88 \times 10^{-3}$ MPa).

Ten days later, inspect whether there is any leakage of water at the bottom of the glass tube.

5. Alkali-resistance Test

Equipment and method of this test are the same as that of Water Permeability Test, except that water is replaced by saturated aqueous solution of calcium hydroxide.

Ten days later, inspect whether there is any leakage of water at the bottom of the glass tube.

6. Acid-resistance Test

Equipment and method are the same as that of Water Permeability Test, except that water is replaced by an aqueous solution of 1.2% HCl.

Ten days later, inspect whether there is any leakage of water at the bottom of the glass tube.

7. Heat-resistance Test 100 grams of the sample of the powder of the present invention is added into a dry crucible. Then the crucible having loaded with the powder of the present invention is put into an electric oven at the temperature of 190°±2° C. The temperature of the oven is keeped at 190°±2° C. for 24 hours, and then is taken out and cooled to ambient temperature. Then Water Permeability Test of the powder sample after Heat-resistance Test is carried out.

8. Frost-resistance Test 100 grams of the sample of the powder of the present invention is weighed and added into a plastic bag. Said bag is squeezed with hand to squeeze out the air present in said bag. Said bag is sealed with wax and then is put into a refrigerator or freezer of temperature $-70°\pm2°$ C. Said bag having loaded with the powder of the present invention is cooled in the refrigerator or freezer at the temperature of $-70°\pm2°$ C. for 24 hours. Then said bag is taken out and let the temperature of said bag arised naturally until ambient temperature is reached. After that, Water Permeability Test of the powder sample after Frost-resistance Test is carried out.

9. Ageing-resistance Test 100 grams sample of the powder of the present invention is weighed and spreaded over a white paper unformly. The thickness of the layer of said powder over the paper is 3 mm. The sample on the paper is irradiated continuously for 200 hours with high voltage mercury quartz ultraviolet lamp of 700 W at a distance of 30 cm over the sample. After that, Water Permeability Test of the powder sample after Ageing-resistance Test is carried out.

10. Insulation Test

A layer of the powder of the present invention in the thickness of 8 mm is preaded over the flat bottom of dry glass utensil having a diameter of 10 cm and a height of 2 cm. The reading on the milliammeter in the testing circuit is observed at the conditions of voltage of 300 voltage and distance between the two testing terminals of 1 mm.

11. Radiation Test

The contents of the natural radiative nuclides $^{226}$Ra, $^{232}$Th and $^{40}$K in the powder of the present invention are measured according to GB 6566-86.

The process for preparing the multifunctional powder for protecting buildings of the present invention comprises the following steps:

a. roasting and decomposing natural limestone, dolomite and marble at a temperature in the range of 900°–1000° C., 1700°–1800° C., and 730°–760° C. respectively, slaking the decomposed products with water, removing the particles having larger diameters (the undecomposed raw ores) from the slaked products by coarse sieving with a screen of 20 mesh, crushing the coarse screen underflows after coarse screening in a roll type crusher, removing the heavy components in therein after crushing, carbonizing the remains in carbonizing furnace and then dehydrating and drying, finally screening the dried powders with fine screen of mesh 325 separately and obtaining fine powders of refined limestone, dolomite and marble respectively;

b. putting the powders obtained in step a) in a drying stove and dried at temperature of 160°–300° C. separately and obtaining powders having moisture content of less or equal to 1.5 percent by weight;

c. mixing the dried powders obtained from step b) at a weight proportion of refined limestone:dolomite:marble=60–90:5–25:5–25 and transferring the mixture into a stirrer, keeping the temperature in said stirrer in the range of 120°–200° C., and adding at least 0.3 percent by weight (based on the total weight of said fine powders mixture) of a straight-chain alkyl acid or a straight-chain alkane containing 16–25 carbon atoms into said stirrer and stirring for 15–60 minutes, finally cooling the products obtained thereof to ambient temperature.

According to the process of the present invention, the size of the fine powders of limestone, dolomite, and marble is larger or equal to 325 mesh. These three fine powders are added into a stirrer for mixing, and the mixture is treated with an organic hydrophobic agent—a straight-chain alkyl acid or a straight-chain alkane containing 16–25 carbon atoms—at a temperature of 160°–200° C. The weight proportion of these three fine powders, that is to say, the fine powder of refined limestone:dolomite:marble in the mixture of these three powders is preferably in the range of 70–80:10–15:10–15, more preferably is 80:10:10.

The above mentioned mixture of said three fine powders is mixed with said organic hydrophobic agent and stirred for about 15–60 minutes in a stirrer at a temperature of 160°–200° C. The preferable organic hydrophobic agent is octadecylic acid. In said stirrer, the reaction between said powder mixture and an organic hydrophobic agent, such as a straight-chain alkyl acid is shown as follows:

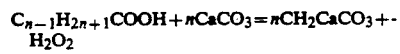

After reaction, the whole surfaces of said fine powders are thoroughly packed with said organic hydrophobic agent and a layer of said agent is formed covering the whole surfaces of said powders. The microstructure of which is shown in the attached drawing.

Since the whole surface of the multifunctional powder for protecting buildings of the present invention is packed thoroughly by an organic hydrophobic layer, its water-proofing performance is excellent.

According to the process of the present invention, the methods and equipments adopted for slaking said deomposed products of limestone, dolomite and marble, carbonizing said slaked products, as well as removing the heavy components present in said carbonized products are methods and equipments known in the prior arts.

Compared with the materials for protecting buildings known in the prior arts, the multifunctional powder for protecting buildings of the present invention possesses the following advantages:

1. possessing several superior protecting characteristics, such as superior heat-isolation, heat-preservation, water-proofing, insulation and combustion retardation;

2. possessing superior shock resistance, crack resistance, seepage resistance, leakage resistance and ageing resistance; in case of the crevice of the fundation of a building, said powder of the present invention will fill up and seal said crevice;

3. It is chemically stable, nonpoisonous, ordorless, non-putrescible, non-pollutive to the environment, easy to be used. The cost of said powder is low, and the field of application of it is very wide. It can either be used alone or together with binders such as cement, and remarkable protecting effects can be achieved.

The present invention will be further described and illustrated, but not limited by the following examples. Certain modifications, within the scope of these teachings, will be apparent to those in the art.

EXAMPLE 1

Natural limestone was roasted at 920° C. for decomposition. Water was added to the decomposed product for slaking. The slaked product was sieved with a sieve of 20 mesh to remove the undecomposed limestone. The screen underflows was further crushed in a roll crusher, then the heavy components was removed from it. The carbonization of the product was then carried out in a carbonizing furnace. After carbonization, the powder product obtained thereof was screened with a screen of 325 mesh, thus a fine powder of refined limestone (super light calcium carbonate) was obtained.

Natural dolomite and marble were treated with the same procedures stated above, except that the decomposing temperature were 1720° C. and 750° C. respectively. Thus, fine powders of refined dolomite and marble were obtained.

The obtained fine powders of refined limestone, dolomite and marble were dried separately in druying stove at a temperature of 300° C. to reduce their moisture content to 0.8 percent by weight. Then they were cooled to 180° C. and loaded in a stirrer at the weight proportion of refined limestone:dolomite:marble=70:15:15. The temperature was maintained to 180° C., 0.5 percent by weight (based on the total weight of the mixture of said three powders) of octadecylic acid was added into the stirrer and stirred for 30 minutes, and then cooled to ambient temperature to obtain the multifunctional powder of the present invention. The physical performance of the multifunctional powder were as follows:

Appearance: White
Bulk specific gravity: 505 Kg/m$^3$
Coefficient of thermal conductivity: 0.085 W/m.K
Moisture content: 0.5 percent by weight
Heat value: <150 KJ/Kg
Heat resistance: no water leakage
Frost resistance: no water leakage
Alkali resistance: no water leakage
Acid resistance: no water leakage
Insulation Test: Reading on the milliameter is zero
Radioactive nuclides:
 $^{232}$Th 1.30±0.32 Bq/Kg
 $^{226}$Ra 3.47±0.34 Bq/Kg
 $^{40}$K 24.76±1.23 Bq/Kg
 $m_{Ra}$=0.018
 $m_r$=0.022
Ageing resistance: no agglomerate, no water leakage.

EXAMPLE 2

A multifunctional powder was prepared by adopting the same process of Example 1, except that the weight proportion of refined limestone, dolomite, and marble was changed to 80:10:10, the temperature in the stirrer was kept at 200° C. The physical performances of the powder prepared in this Example were listed as follows:

Appearance: White
Bulk specific gravity: 508 Kg/m$^3$
Coefficient of thermal conductivity: 0.083 W/m.K
Heat value: <150 KJ/Kg
Moisture content: 0.8 percent by weight
Heat resistance: no water leakage
Frost resistance: no water leakage
Alkali resistance: no water leakage
Acid resistance: no water leakage
Insulation Test: Reading on the milliameter is zero
Radioactive nuclides:
 $^{232}$Th 1.33±0.31 Bq/Kg
 $^{226}$Ra 3.53±0.33 Bq/Kg
 $^{40}$K 25.07±1.41 Bq/Kg
Ageing resistance: no agglomerate, no water leakage.

EXAMPLE 3

The same process of Example 2 was adopted, except that octadecylic acid was replaced by wax. The physical performances of the powder prepared thereof were listed as follows:

Appearance: White
Bulk specific gravity: 515 Kg/m$^3$
Coefficient of thermal conductivity: 0.089 W/m.K
Moisture content: 0.82 percent by weight
Heat value: <150 KJ/Kg
Heat resistance: no water leakage
Frost resistance: no water leakage
Alkali resistance: no water leakage
Acid resistance: no water leakage
Insulation Test: Reading on the milliameter is zero
Radioactive nuclides:
 $^{232}$Th 1.31±0.29 Bq/Kg
 $^{226}$Ra 3.50±0.30 Bq/Kg
 $^{40}$K 24.96±1.36 Bq/Kg
Ageing resistance: no agglomerate, no water leakage.

EXAMPLE 4

The process of Example 2 was adopted, except that the weight proportion of refined limestone, dolomite and marble was changed to 85:10:5, and the temperature in the stirrer was changed to 200° C. 0.5 percent by weight of octadecylic acid was replaced by 0.4 percent by weight of eicosanoic acid. The physical performances of the powder prepared in this example were listed as follows:

Appearance: White
Bulk specific gravity: 525 Kg/m$^3$
Coefficient of thermal conductivity: 0.086 W/m.K
Moisture content: 0.98 percent by weight
Heat value: <150 KJ/Kg
Heat resistance: no water leakage
Frost resistance: no water leakage
Alkali resistance: no water leakage
Acid resistance: no water leakage
Insulation Test: Reading on the milliameter is zero
Radioactive nuclides:
 $^{232}$Th 1.37±0.35 Bq/Kg
 $^{226}$Ra 3.60±0.36 Bq/Kg
 $^{40}$K 25.21±1.43 Bq/Kg
Ageing resistance: no agglomerate, no water leakage.

EXAMPLE 5

The process of Example 1 was adopted, except that said weight proportion was changed to 65:20:15. The physical performances of the powder prepared in this example were listed as follows:

Appearance: White
Bulk specific gravity: 514 Kg/m$^3$
Coefficient of thermal conductivity: 0.087 W/m.K
Moisture content: 0.95 percent by weight
Heat value: <150 KJ/Kg
Heat resistance: no water leakage
Frost resistance: no water leakage
Alkali resistance: no water leakage
Acid resistance: no water leakage
Insulation Test: Reading on the milliameter is zero
Radioactive nuclides:
 $^{232}$Th 1.29±0.30 Bq/Kg
 $^{226}$Ra 3.57±0.31 Bq/Kg
 $^{40}$K 25.12±1.31 Bq/Kg
Ageing resistance: no agglomerate, no water leakage.

What is claimed is:

1. A multifunctional powder for protecting buildings, containing fine refined powders of 60-90 wt % limestone, 5-25 wt % dolomite and 5-25 wt % marble, a hydrophobic agent selected from the group consisting of a straight-chain alkyl acid and straight-chain alkane containing 16-25 carbon atoms, said hydrophobic agent packed closely on the whole surfaces of said fine powders, said hydrophobic agent being at least 0.3 percent by weight based on the total weight of the mixture of said powders.

2. The multifunctional powder according to claim 1, wherein the size of said fine powders is in the range of 325 to 1000 mesh.

3. The multifunctional powder according to claim 1, wherein said alkyl acid is octadecylic acid.

4. The multifunctional powder of claim 1, wherein said weight proportions of limestone, dolomite and marble are in the ranges of 70-80:10-15:10-15, respectively.

5. The multifunctional powder according to claim 4, wherein said weight proportions of limestone, dolomite and marble are 80:10:10, respectively.

6. A process for preparing a multifunctional powder for protecting buildings, comprising:
   a. separately roasting and decomposing natural limestone at a temperature of 900°-1000° C., dolomite at a temperature of 1700°-1800° C. and marble at a temperature of 730°-760° C., slaking the decomposed products with water, removing undecomposed particles having larger diameters from the slaked products by coarse sieving with a screen of 20 mesh, crushing the coarse screen underflows after coarse sieving in a roll type crusher, removing heavy components therein after crushing, carbonizing the remains in a carbonizing furnace and then dehydrating and drying, finally screening the dried powders with fine screen of mesh 325 separately and obtaining fine powders of refined limestone, dolomite and marble respectively;
   b. putting the powders obtained in step a) in a drying stove and drying at a temperature of 160°-300° C. separately and obtaining powders having a moisture content of less than or equal to 1.5 percent by weight;
   c. mixing the dried powders obtained from step b) at a weight proportion of refined limestone:dolomite:marble of 60-90:5-25:5-25, respectively and transferring the mixture into a stirrer, keeping the temperature in said stirrer in the range of 120°-200° C., and adding at least 0.3 percent by weight based on the total weight of said fine powders mixture of straight-chain alkyl acid or straight-chain alkane containing 16-25 carbon atoms into said stirrer and stirring for 15-60 minutes, and finally cooling the products obtained thereof to ambient temperature.

7. A process according to claim 6, wherein said weight proportions of limestone, dolomite and marble are in the range of 70-80:10-15:10-15, respectively.

8. A process according to claim 7, wherein said weight proportions of limestone, dolomite and marble are 80:10:10, respectively.

9. A process according to claim 6, wherein said straight-chain alkyl acid is octadecylic acid.

10. A process according to claim 9, wherein said octadecylic acid is included in the amount of 0.5% by weight.

* * * * *